United States Patent [19]

Clark

[11] Patent Number: 4,738,856
[45] Date of Patent: Apr. 19, 1988

[54] BEVERAGE AND METHOD FOR MAKING A BEVERAGE FOR THE NUTRITIONAL SUPPLEMENTATION OF CALCIUM IN HUMANS

[75] Inventor: George H. Clark, Carlsbad, Calif.

[73] Assignee: Nutrition Technologies, Inc., Carlsbad, Calif.

[21] Appl. No.: 863,157

[22] Filed: May 14, 1986

Related U.S. Application Data

[63] Continuation-in-part of Ser. No. 733,088, May 13, 1985, abandoned.

[51] Int. Cl.$^4$ ............................................. A23L 2/00
[52] U.S. Cl. ..................................... 426/74; 426/590; 514/574
[58] Field of Search ............... 426/590, 599, 804, 810, 426/548, 656, 330.3, 658, 74, 285, 648, 591; 424/153, 149, 154; 514/583, 557, 574, 579, 620, 23, 561, 269, 811

[56] References Cited

U.S. PATENT DOCUMENTS

| | | | |
|---|---|---|---|
| 2,224,252 | 12/1940 | Callaway | 426/590 |
| 3,009,859 | 11/1961 | Laborit | 514/47 |
| 3,114,641 | 12/1963 | Sperti et al. | 426/599 |
| 3,657,424 | 4/1972 | Aktins et al. | 426/599 |
| 3,755,592 | 8/1973 | Ahrens | 514/474 |
| 4,325,975 | 4/1982 | Lindon et al. | 426/74 |
| 4,448,770 | 5/1984 | Epting et al. | 424/153 |
| 4,551,342 | 11/1985 | Nakel et al. | 426/548 |

OTHER PUBLICATIONS

Hirotsuka et al. 1984 Calcium Fortification of Soy Milk with Calcium-Lecithen Lysosome System J. Food Science 49:1111.
Nelson et al. 1980 Fruit and Vegetable Juice Processing Technology AVI Publishing Co., Westport, CT pp. 530–531.
Furia 1968 CRC Handbook of Food Additives CRC Press Cleveland, Ohio p. 293.

Primary Examiner—Raymond N. Jones
Assistant Examiner—Carolyn Paden
Attorney, Agent, or Firm—John Wade Carpenter

[57] ABSTRACT

A beverage solution is disclosed which contains per 354 ml.: 0.5–50.0 meq. of calcium ions, 0.5–50.0 meq. of magnesium ion, and 1.0–10.0 meq. of potassium ion, sweetener agent; and a stabilizer. In the beverage each of calcium, magnesium, and potassium ions is in the form of a salt such as asparatate, orotate, ascorbate, and mixtures thereof. A method of preparing or making the beverages.

23 Claims, No Drawings

BEVERAGE AND METHOD FOR MAKING A BEVERAGE FOR THE NUTRITIONAL SUPPLEMENTATION OF CALCIUM IN HUMANS

This is a continuation-in-part application of any copending application filed on May 13, 1985 and having Ser. No. 733,088, now abandoned.

FIELD OF THE INVENTION

This invention is related to a beverage for consumption by humans. More specifically, this invention provides a beverage for comsumption by persons needing nutritional supplementation of calcium and magnesium. The beverage of this invention reduces blood pressure, accelerates the reduction of blood alcohol into inactive forms, and supplies a rapidly and higher absorbable source of calcium which does not cause gastric upset and stomach bloating.

BACKGROUND OF THE INVENTION

Nutrition plays an important role in all aspects of bone physiology. Poor eating habits will prevent normal development of bone in childhood and early adulthood, and can accelerate the rate of bone loss with advancing age.

Although overall good nutrition is important, research has shown that the absolute amounts of calcium and the relative ratio of calcium to certain other foodstuffs in the diet are the most crucial nutrition and determinants of bone health. Calcium has also been discovered to lower blood pressure, and hypertension and has demonstrated an ability to suppress colon cancer. All persons experience a decline in their ability to absorb calcium with advancing age. Men and women also develop a relative deficiency in lactase, the enzyme necessary to digest the sugar lactose found in milk; and this leads to a decreased consumption of calcium-rich milk and other dairy products. In women, menopause brings on an additional decline in the efficiency of calcium absorption. In order to protect the bones of females at menopause, their calcium requirement jumps from a recommended daily allowance (RDA) of 800 milligrams (pre-menopausal) to 1400 milligrams (post-menopausal). Unfortunately, this is the time when many women are developing "lactose intolerance" or eliminating dairy products from their diet due to their contents of fats and sugar. North-American women on the average only consume around 450 milligrams of calcium each day.

Females must also be concerned with the calcium to phosphorus ratio in their daily diet. Phosphorus is also an essential component of bone but if the ratio of calcium to phosphorus falls below 2:1, then the excess phosphorus will compete with calcium and calcium absorption will be reduced. Phosphorus is widely used as a food additive and is therefore a major component of many processed foods, especially soft drink beverages. In order to maintain the proper ratio, calcium intake and absorption must be increased.

Magnesium is another mineral which is essential in the daily diet. Magnesium combines with calcium to augment the lowering of blood pressure and hypertension, and further suppress colon cancer. Magnesium is also required for many enzyme activities and for nueromuscular transmission.

There is some evidence that supplemental magnesium in the diet may help also prevent the formation of calcium oxalate stones in the kidney, and in females it may aid in the reduction of premenstrual tension and the severity of menstrual cramps.

Potassium is also another mineral which is essential for the human body. Potassium has been found to additionally and further aid females in the reduction of premenstrual tension and severe menstrual cramps as well as leg cramps in active women.

Required levels of calcium, magnesium and potassium cannot be supplemented by commercial, non-dairy beverages for they are unavailable. The prior art does not teach or suggest any beverage for nutritional supplementation of high levels of calcium alone, or high levels of calcium and magnesium, or potassium along with high levels of calcium and magnesium.

Laborit et al in the U.S. Pat. No. 3,009,859 (patented Nov. 21, 1961) teaches potassium and magnesium aspartate compositions as anti-fatigue drugs. Laborit et al teaches that fatigue is relieved by the salts of aspartic acid. Laborit et al does not teach or suggest that fatigue is due to the replacement of essential fluids lost through perspiration and the physiological effects of potassium and magnesium ions. Laborit et al does not teach or suggest the necessity of having and administering both the potassium and magnesium salt of aspartic acid. Laborit et al does not teach or suggest the appropriate number of meq. of potassium or calcium ion to number of meq. of magnesium ion ratio to provide the suitable amount of fluid for intake by the average human body. Laborit et al does not teach or suggest calcium aspartate or calcium orotate for reducing blood pressure and reducing blood alcohol into inactive forms, and supplying a rapidly and higher absorbable source of calcium which does not cause gastric upset and stomach bloating.

Epting Jr. in U.S. Pat. No. 4,448,770 (patented on May 15, 1984, over twenty-two (22) years after Laborit et al's patent) teaches prompt availability of electrolytes as important in maintaining body fluid electrolyte levels of persons, and disclose a beverage comprising an aqueous solution, containing per gallon: 30–50 meq. of K ion (which can be in the form of chloride, nitrate, sulfate, acetate, lactate, tartrate, benzoate, citrate, or other soluble salt, with chloride being the preferred); 5–10 meq. of Ca ion (which is in the form of a soluble salt such as acetate, chloride, gluconate, iodide, lactate, maleate, nitrate, and proprionate, with gluconate being the preferred); 1–3 meq. of Mg ions (which is introduced in the form of a soluble salt such as acetate, benzoate, chloride, iodide, lactate, nitrate, with chloride being the preferred), and sucrose which is hydrolyzed in the digestive tract to glucose and fructose, which are absorbed into the blood stream and further metabolized. Epting teachs the use of sucrose in the beverages of his inventions provides a carbohydrate source which permits release of energy in the slower but more sustained, fashion than is possible when glucose is used as the principal carbohydrate source. Epting discloses an aqueous solution containing per gallon a 1.6–10.0 Ca ion to Mg ion ratio, and a 11.6–60K ion plus Ca ion, to Mg ion ratio. Epting Jr. does not teach or suggest introducing the Ca ion or the Mg ion or the K ion into the aqueous solution in the form of a non-soluble salt. Epting Jr's beverage could over medicate the average human body and limit the amount of fluid intake because of an insufficient quantity of Mg ions when compared to the quantity of K and Ca ions. The Mg ion is the "gate" ion which controls the absorption of the K and Ca ions from the human gut.

Kahm in U.S. Pat. No. 4,024,684 provides a dietetic beverage containing sugar, sodium chloride, potassium chloride and citric acid for supplementing sugars and essential salts in a mammalian body, depleted thereof during vigorous physical exercise.

Callaway in U.S. Pat. No. 2,224,252 discloses an alkaline food product containing sodium, potassium, calcium and magnesium which product is admixed with various food or drinks. The product is said to correct the acid-base balance of athletes or of people suffering from acidosis.

Polli et al have proposed in U.S. Pat. No. 3,337,404 an effervescent composition, based on potassium chloride, for potassium replacement therapy. The composition also contains citric acid and a soluble sweetener. The effervescense of the composition is said to mask the unpalatable taste normally associated with potassium-containing solutions.

Citrus fruit beverages of concentrates, fortified with various inorganic salts, have been proposed by Aktins et al (U.S. Pat. No. 3,657,424), Sperti, et al (U.S. Pat. No. 3,114,641) and Houghtaling et al (U.S. Pat. No. 3,227,562).

A product marketed as Gatorade R contains no fruit juice, but is artificially flavored with lemon-lime flavoring and contains glucose, sucrose, citric acid, salt, sodium citrate, sodium phosphate and potassium citrate. The product presently available contains 16 mq of sodium and 3 mq of potassium per ounce.

Hand et al in U.S. Pat. No. 4,154,814 have disclosed a therapeutic chewing gum containing sodium and potassium chlorides, wherein the ratio of NaCl:KCl is at least 3:1.

What is needed and what has been invented by me is an all natural, non-dairy beverage for the nutritional supplementation in humans of calcium and magnesium and reducing blood pressure. What is also needed and what has been invented by me is a beverage which facilitates and controls the transport of the calcium ion into the human body, while lowering blood pressure and lowering the probability or tendency of incurring colon cancer. The beverages may also provide nutritional supplementation of magnesium and/or potassium to the human diet, and help to reduce premenstrual tension in women, and increase cardiac tolerance in conditions of anoxia. Any blood alcohol present in the human body is lowered by the beverage of this invention while supplying a rapidly and higher absorbable source of calcium to the human body and not causing any gastric upset and stomach bloating.

SUMMARY OF THE INVENTION

The present invention accomplishes its desired objects by broadly providing a method for preparing a beverage for reducing blood pressure in a human body while supplying a rapidly, absorbable source of calcium for the human body and not causing any gastric upset and stomach bloating and which is essentially free of sodium ion, comprising the steps of:

(a) heating a predetermined volume of a liquid solvent to a temperature of at least 70° F., more preferably from 180° F. to 220° F.;

(b) adding to the heated liquid solvent of step (a), per 354 ml. of finally prepared beverage, 0.5-50.0 meq. of calcium ions supplied by calcium ascorbate and a calcium compound selected from the group consisting of calcium aspartate, calcium orotate, and mixtures thereof;

(c) stirring the solution of step (b) until the calcium compound is dissolved in the solution; and (d) adding, optionally and if necessary, make-up liquid solvent to the solution of step (c) to obtain a final prepared beverage containing substantially no sodium, potassium, and magnesium ions except those present in minor amounts of flavoring agents, preservatives, or other minor additives.

The process additionally comprise adding 0.5-50.0 meq. of magnesium ions supplied by a magnesium compound selected from the group consisting of magnesium aspartate, magnesium orotate, and mixtures thereof, and, optionally, magnesium ascorbate, and 1.0-10.0 meq. of potassium ions supplied by a potassium compound selected from the group consisting of potassium aspartate, potassium orotate, potassium ascorbate, and mixtures thereof.

The present invention also accomplishes its desired object by broadly providing a beverage for reducing blood pressure in a human body while supplying a rapidly and higher absorbable source of calcium for the human body and not causing any gastric upset and stomach bloating, comprising a beverage solution containing per 354 ml.: 0.5-50.0 meq of calcium ion and 1-50 g. of a sweetener. The beverage may additionally comprise 0.5-50.0 meq of magnesium ion, and 1.0-10.0 meq. of potassium ion. The calcium ions are supplied by calcium ascorbate and a salt selected from the group consisting of aspartate, orotate and mixtures thereof. The magnesium ions are supplied by a salt selected from the group consisting of aspartate, orotate, and mixtures thereof; and, optionally, the magnesium ions may be additionally supplied by magnesium ascorbate. The potassium ions are supplied by a salt selected from the group consisting of aspartate, orotate, ascorbate, and mixtures thereof. The beverage additionally preferably comprises a tartness agent, a smoothness agent, a flavoring agent, and a pH adjusting agent.

The present invention further accomplishes its desired objects by providing a process for reducing blood pressure in a human body and/or accelerates the reduction of blood alcohol in the human body into inactive forms, and/or supplying a rapidly and higher absorbable source of calcium for the human body, and not causing any gastric upset and stomach bloating comprising the steps of:

(a) preparing a beverage comprising a beverage solution containing per 354 ml.: 0.5-50.0 meq. of calcium ions supplied by calcium ascorbate and a calcium compound selected from the group consisting of calcium aspartate, calcium orotate, and mixtures thereof; and (b) ingesting the beverage of step (a) into a human body whose blood pressure is to be reduced without causing any gastric upset and stomach bloating.

Therefore, it is an object of the present invention to provide beverage compositions which lower blood pressure and provide nutritional supplementation of calcium in humans while not causing gastric upset and stomach bloating.

It is another object of this invention to provide beverage compositions which accelerate the reduction of blood alcohol into inactive forms and provide nutritional supplementation of potassium and magnesium in humans, as well as calcium, while not causing gastric upset and stomach bloating.

It is yet another object of this invention to provide a method for making or preparing the beverage compositions.

These, together with the various ancillary objects and features which will become apparent to those skilled in the art as the following description proceeds, are attained by the beverages of this invention and the method for preparing or making the beverages.

DETAILED DESCRIPTION OF THE INVENTION

The beverage compositions of this invention are for consumption by humans needing or desiring nutritional supplementation of calcium in their diet. The beverage compositions reduce blood pressure and accelerates the reduction of blood alcohol in the human body into inactive forms while supplying a rapidly and higher absorbable source of calcium for the human body and not causing any gastric upset and stomach bloating. The beverage compositions are essentially sodium free and contain no sodium ions except that present in minor amounts of flavoring agents, preservatives, or other additives.

In a preferred embodiment of the invention, the beverage compositions comprise a beverage solution containing per 354 ml.: 0.5–50.0 meq. of calcium ions supplied by calcium ascorbate and a calcium compound selected from the group consisting of calcium aspartate, calcium orotate, and mixtures thereof; and 1.0–50.0 g. of a sweetener agent. More preferably, the beverage composition comprises a beverage solution containing per 354 ml.: 0.5–10.0 meq. of calcium ions supplied by calcium ascorbate and a calcium compound selected from the group consisting of calcium aspartate, calcium orotate, and mixtures thereof; and 10.0–40.0 g. of a sweetener agent. Most preferably the calcium compound is calcium aspartate. The preferred embodiment of the beverage compositions preferably additionally comprise per 354 ml. of beverage solution; from about 0.02 g. to about 3.50 g. of a tartness agent; from about 0.25 g. to about 1.0 g. of a pH adjusting agent in order to adjust the pH of the preferred embodiment of the beverage from about 3.0 to about 4.5; from about 0.10 g. to about 3.0 g. of a smoothness agent; and from about 0.05 ml. to about 50.0 ml. of a flavoring agent. This preferred embodiment of the beverage compositions are to be consumed by persons who wish to supplement dietary calcium, lower their blood pressure, accelerate the reduction of blood alcohol into inactive forms, and lower any probability or tendency of incurring colon cancer.

In a more preferred embodiment of the present invention, the beverage compositions comprise a beverage solution containing per 354 ml.: 0.5–50.0 meq. of calcium ions supplied by calcium ascorbate and a calcium compound selected from the group consisting of calcium aspartate, calcium orotate, and mixtures thereof; 0.5–50.0 meq. of magnesium ions supplied by a magnesium compound selected from the group consisting of magnesium aspartate, magnesium orotate, and mixtures thereof; and 1.0–50.0 g of a sweetener agent. In addition to the magnesium ions being supplied from magnesium aspartate and/or magnesium orotate, the magnesium ions may be supplied by magnesium ascorbate. A purpose for employing and furnishing the magnesium ions in the stated meq. is to facilitate and control the transport of the calcium ions into the average human body for use while simultaneously providing nutritional supplementation of magnesium to the human diet. Supplementing the calcium compound(s) with the magnesium compound(s) also provides a greater effect in lowering blood pressure, accelerating the reduction of blood alcohol into inactive form, and decreasing any probability or tendency of incurring colon cancer in the average human being than if the calcium compound was employed alone. More preferably, the beverage compositions in this more preferred embodiment of the present invention comprises a beverage solution containing per 354 ml: 0.5–10.0 meq. of calcium ions supplied by calcium ascorbate and a calcium compound selected from the group consisting of calcium aspartate, calcium orotate, and mixtures thereof; 0.5–5.0 meq. of magnesium ions supplied by a magnesium compound selected from the group consisting of magnesium aspartate, magnesium orotate, and mixtures thereof; and 10.0–40.0 g. of the sweetener agent. The magnesium ions may also be supplied by magnesium ascorbate in addition to being supplied by magnesium aspartate and/or magnesium orotate. This more preferred embodiment of the beverage compositions preferably additionally comprise per 354 ml. of beverage solution: from about 0.20 g. to about 1.5 g. of a tartness agent; from about 0.30 g. to about 0.90 g. of a pH adjusting agent in order to adjust the pH of the more preferred beverage from about 3.0 to about 4.5; from about 0.15 g. to about 2.0 g. of a smoothness agent; and from about 0.10 ml. to about 45.0 ml. of a flavoring agent. In this more preferred embodiment for the beverage compositions, the beverage is essentially free of potassium ions in that the beverage composition contains no potassium ions except that present in minor amounts of flavoring agents, preservatives, or other minor additives.

For those persons needing additional potassium in their diet, such as women in reducing premenstrual tension, the calcium and magnesium compounds of this invention may be combined with a potassium compound to produce a most preferred embodiment of the present invention wherein the beverage compositions comprise a beverage solution containing per 354 ml.: 0.5–50.0 meq. of calcium ions supplied by calcium ascorbate and a calcium compound selected from the group consisting of calcium aspartate, calcium orotate, and mixtures thereof; 0.5–50.0 meq. of magnesium ions supplied by a magnesium compound selected from the group consisting of magnesium aspartate, magnesium orotate and mixtures thereof, and, optionally, the magnesium ions may be additionally supplied by magnesium ascorbate; 1.0–10.0 meq. of potassium ions supplied by a potassium compound selected from the group consisting of potassium aspartate, potassium orotate, potassium ascorbate, and mixtures thereof; and 1.0–50.0 g. of a sweetener agent. In addition to providing the magnesium ions to facilitate and control the transport of the calcium ions into the average human body, the stated meq. of the magnesium ions facilitates and controls the transport of the potassium ions into the average human body for use, while also simultaneously providing nutritional supplementation of magnesium to the human diet. Furthermore, the stated meq. of the magnesium ions and the stated meq. of the calcium ions, given in conjunction with the stated meq. of the potassium ions, in conditions of anoxia generally increases the cardiac tolerance of the condition, while the potassium ions alone, is generally ineffective. More preferably with respect to this most preferred embodiment of the present invention, the beverage compositions comprise a beverage solution containing per about 354 ml.: 0.5–10.0 meq. of calcium ions supplied by calcium ascorbate and a calcium compound selected from the group consisting of calcium aspartate, calcium orotate, and mixtures thereof; 0.5–5.0 meq. of a magnesium ions supplied by a magnesium compound selected from the group consisting of magnesium aspartate, magnesium orotate, and mixtures thereof, and, optionally, the supply of magnesium ions may additionally come from magnesium ascorbate; 1.0–2.0 meq. of potassium ions supplied by a potassium compound selected from the group consisting of potassium aspartate, potassium orotate, potassium ascorbate and mixtures thereof; and 10.0–40.0 g. of a sweetener agent. Most preferably, the calcium compound is calcium aspartate, the magnesium compound is magnesium aspartate, and the potassium compound is potassium aspartate. In this most preferred embodiment of the invention, the beverage preferably additionally comprises a beverage solution containing per 354 ml.: from about 0.3 g. to about 0.7 g. of a tartness agent; from about 0.30 g. to about 0.60 g. of a pH adjusting agent in order to adjust the pH of the most preferred embodiment of the beverage from about 3.0 to about 4.5; from about 0.20 g. to about 0.6 g. of a smoothness agent; and from about 0.18 ml. to about 36 ml. of a flavoring agent.

The beverage compositions of this invention may be consumed by persons desiring nutritional supplementation calcium in the daily human diet. If magnesium supplementation, or magnesium and potassium supplementation, is needed, such supplementation may be added in accordance with the stated meq. The beverage compositions are all-natural, non-dairy compositions which may be consumed periodically in place of water or other beverages. The beverages are prepared to be highly palatable, and do not irritate the gastric mucosa. The calcium ion alone embodiment of the invention, or the calcium ion plus magnesium ion alone embodiment, reduces or lowers blood pressure in a human being blood and/or supplies a rapidly and higher absorbable source of calcium to a human body (or animal), all while not causing any gastric upset and stomach bloating.

The beverage compositions are rapidly absorbed into the blood stream, and do not contain high amounts of sodium, glucose, dextrose, sucrose or synthetic sweeteners, artificial coloring or flavoring, preservatives, or other non-essential elements which may cause nausea and/or inhibit the absorption of fluids by the average human body.

An important active constituent(s) in the beverage compositions of this invention are the chelating agent(s). I have discovered that the active chelates chosen should preferably be of natural origin, non-toxic, non-irritating to the buccal cavity, alimentary canal, gastric mucosa, or the intestinal tract. The chelates should preferably also be tightly bound, easily absorbed and transferred to the muscle cells, easily metabolised, and must not interfere with the absorpiton of water by the intestines.

In a preferred embodiment of this invention, the chelates of the beverage compositions of this invention are the chelates of ascorbate, aspartate and orotate chelates; more specifically, as was previously mentioned, calcium ascorbate $Ca(C_8H_7O_6)_2$, calcium aspartate $(C_8H_{12}CaN_2O_8)$, calcium orotate $[(C_5H_3N_2O_4)_2Ca. 2.5\ H_2O]$, potassium ascorbate $(K\ C_6H_7O_6)$, potassium asparate $(C_4H_6KNO_4)$, potassium orotate $(C_5H_3N_2O_4.K. 2.5\ H_2O)$, magnesium ascorbate $Mg\ (C_6H_7O_6)_2$, magnesium aspartate $(C_8H_{12}M_gN_2O_8)$, and magnesium orotate $[(C_5H_3N_2O_4)_2Mg. 2.5\ H_2O]$. These particular chelates are non-toxic, tightly bound, non-irritating to the buccal cavity, alimentary canal, gastric muscosa or intestinal tract. These particular chelates also do not impede the absorption of water from the intestinal tract because of the fact that their ionic charge is opposite to that of the gastric mucosa or intestinal wall. They are easily absorbed and are quickly transferred to the tissues whereupon any released calcuim ions, magnesium ions, and potassium ions, enter the cells to replace calcium, magnesium and potassium, respectively, which may have been depleted. The amino acid is then metabolised. These chelate substances are physiologically compatible with the systems of humans.

When the beverages of this invention are administered and ingested to a human body, the calcium ascorbate and/or calcium aspartate and/or calcium orotate contained within the beverage provides a rapid and highly absorbable source of calcium to the human body. I have discovered that the aspartate and orotate salts of calcium are not readily soluble salts. The aspartate, orotate, and ascorbate salts of calcium allow the calcium ion to be absorbed in the human body quicker than other calcium salts, such as when the calcium ion is in the form of chloride, nitrate, acetate, lactate, gluconate, iodide, maleate, propionate, which are soluble salts. As used in this specification and the appended claims, the beverage solution for the purposes of this invention contains not only the beverage ingredients but also comprises from about 70 vol % to about 90 vol. % of a "liquid solvent", which is compatible for the purposes of this invention and is generally th starting material in preparing and making the beverages.

Stated alternatively, each 354 ml of the beverage solution would contain from about 247.8 ml. to about 318.6 ml. of the "liquid solvent" as the major component of the beverage solution. While not intending to be bound by any particular liquid, the "liquid solvent" would include pure liquids, and liquid solutions, both alcoholic and non-alcoholic, and may more particularly include, but not be limited to, aqueous solutions, carbonated water, non-carbonated water, mineral water, distilled water, soft drinks, beer, malt and/or hop beverages, wine, coffee, tea, alcoholic mixed drinks in general, as long as such pure liquids and liquid solutions meet the specifications of the present invention. Preferably, the liquid solvent is demineralized, carbon filtered potable water. Carbonation is added to a level of 3.6–3.9 parts.

It is to be understood that while the preferred calcium chelates for supplying or forming 0.5–50 meq. of calcium ions are calcium ascorbate, and calcium aspartate and/or calcium orotate, the 0.5–50 meq. of calcium ions may be supplied solely by calcium aspartate and/or calcium orotate. The ascorbate salt of calcium employed along with the calcium aspartate and/or the calcium orotate performs the following dual purpose: (1) the ascorbate anion of calcium ascorbate along with calcium aspartate and/or calcium orotate, aids the absorption of the calcium ion into the blood stream of the human body (2) the ascorbate anion of calcium ascorbate, as opposed to calcium aspartate and/or calcium orotate, also aids the use by the human body of the calcium ions (that have been absorbed into the blood) for formation of bone matrix by directing, causing and-/or facilitating the cause of the calcium ions to migrate or travel, or the like, to the bones of the human body to form the bone matrix. Stated Alternatively, the ascorbate anion from calcium ascorbate directs or channels the calcium ions towards the bones of the human body for use in the formation of bone matrix before other parts including tissues of the human body have absorbed a substantial portion of the calcium ions. Obviously, even with the employment of calcium ascorbate, some of the other parts and tissues of the human body will absorb some of the calcium ions. Similarly, without the employment of calcium ascorbate, obviously some bone matrix will be formed from the calcium ions that have been absorbed into the blood from the calcium aspartate and/or calcium orotate. But ascorbate anion from calcium ascorbate provides a catalyst to expedite, speed-up or bias the movement or travel of the calcium ions from the blood stream to the bones of the human body, when calcium ascorbate is employed with calcium aspartate and/or calcium orotate.

I have also discovered that by employing calcium aspartate and/or calcium orotate with calcium ascorbate in a ratio of from approximately 1.2 to about 2.8 parts of the calcium aspartate and/or calcium orotate to about 1 part calcium ascorbate (with the preferred ratio being about 1.5) that the combination enables a greater portion or amount of the calcium ions supplied from both calcium compounds to be absorbed into the blood stream of a human body than if the calcium ascorbate, or the calcium aspartate and/or calcium orotate were employed alone. For example, if a beverage solution containing per 354 ml. 25 meq. or calcium ions supplied by 1.5 parts of calcium aspartate and/or calcium orotate to 1 part calcium ascorbate, is administered to a set of human subjects and the amount of calcium ions in the blood is determined every half hour from blood samples taken from human subjects every half hour, it would be found that on an average a larger portion of the 25 meq. of calcium ions would have been absorbed into the blood stream than if a beverage solution containing per 354 ml. 25 meq. of calcium ions supplied solely by calcium ascorbate, or solely by calcium aspartate and/or calcium orotate, is administered to a similar set of human beings with the amount of calcium ions in the blood being measured at the same half hour time intervals. Thus, the ascorbate anion from calcium ascorbate provides a synergistic effect with respect to the amount of meq. of calcium ions that are absorbed into the blood when calcium ascorbate is combined with calcium aspartate and/or calcium orotate.

I have further discovered that by using calcium ascorbate with calcium aspartate and/or calcium orotate in the beverage compositions of this invention, the bone mass after a predetermined period of time of consuming the beverage compositions will be from about 10% to about 35% by weight greater than if the calcium aspartate and/or calcium orotate were used alone without a certain quantity of the calcium ions emanating from calcium ascorbate. When 0.5-50 meq. of calcium ions are to be supplied by calcium ascorbate and calcium aspartate and/or calcium orotate, in order to receive the benefit of having 10-35% by weight greater bone mass from consumption after a predetermined period of time, at least 15% of the 0.5-50 meq. of calcium ions should be supplied by calcium ascorbate. More preferably, 40-60% of the 0.5-50 meq. of calcium ions should be supplied by calcium ascorbate. In a preferred embodiment of the invention, I have discovered that if less than about 15% of the 0.5-50 meq. of calcium ions are supplied in the beverage compositions by calcium ascorbate, there would be less than about 10% by weight increase in bone mass when compared to employing only calcium aspartate and/or calcium orotate in the beverage compositions. Thus, there is no substantial benefit from the calcium ascorbate with respect to increasing bone mass unless at least about 15% of the 0.5-50 meq. of calcium ions are supplied by calcium ascorbate. In order to generally provide or supply at least 15% of the 0.5-50 meq. of calcium ions from calcium ascorbate, per each 354 ml. beverage solution preferably contains from about 10 mg. to about 150 mg. of calcium ascorbate. More preferably, 30 mg. to 90 mg. of calcium ascorbate is contained within each 354 ml. of beverage solution. Most preferably, each 354 ml. of beverage solution contains about 60 mg. of calcium ascorbate, the required daily allowance (RDA).

It is to be also understood that while the preferred magnesium chelates for supplying or forming 0.5-50 meq. of magnesium ions are magnesium asparate and/or magnesium orotate, in the event or situation where no or not enough calcium ascorbate is available to supply the preferred amount (i.e. 10 mg to 150 mg.) of calcium ascorbate per 354 ml. of beverage solution, then the preferred amount or remaining amount of ascorbate anions may be supplied by magnesium ascorbate. Generally, if no calcium ascorbate is available, each 354 ml. of beverage solution contains from about 5 mg. to about 120 mg. of magnesium ascorbate. If not enough ascorbate anions has been added from calcium ascorbate, the remaining ascorbate anions may be supplied from magnesium ascorbate in an amount readily discernible to those artisans possessing ordinary skill in the art. By way of example only, if only 30 mg. of calcium ascorbate has been added to each 354 ml. of beverage solution, the remaining ascorbate anions to reach the equivalent ascorbate in 60 mg. of calcium ascorbate may be supplied by the addition of about 18 mg. of magnesium ascorbate. If all or a portion of the required ascorbate anions is supplied by magnesium ascorbate, then the previously mentioned synergistic and unexpected results that were seen for calcium ascorbate would likewise apply to magnesium ascorbate. More specifically, the ascorbate anions from magnesium ascorbate, along with calcium aspartate and/or calcium orotate, aids the absorption of the calcium ion into the blood stream of the human body, and the ascorbate anion from magnesium ascorbate, as opposed to calcium aspartate and/or calcium orotate, also aids the use by the human body of the calcium ions for formation of bone matrix by directing, causing and/or facilitating the cause of the calcium ions to migrate or travel to the bones of the body to form the bone matrix. The ascorbate anion from magnesium is also a catalyst for speeding-up the travel of the calcium ions from the blood stream to the bones of the human body. If the comparable amount of the ascorbate anion in calcium ascorbate is furnished all or in part by magnesium ascorbate, and a ratio comparable to the 1.2-2.8 ratio of calcium aspartate and/or calcium orotate to calcium ascorbate is employed for the magnesium ascorbate (i.e. about 1.6 to about 4.0 parts of the calcium aspartate and/or calcium orotate to about 1 part magnesium ascorbate) that combination enables a greater portion or amount of the calcium ions supplied by calcium aspartate and/or calcium orotate to be absorbed into the blood stream of the human body than if calcium asparate and/or orotate wa employed alone. By combining magnesium ascorbate and calcium ascorbate together to make-up the required amount of ascorbate, the ratio of the calcium aspartate and/or calcium orotate to the combination of ascorbate compounds would preferably be from about 1.2 to about 4.0. Similarly, if all or a portion of the requried ascorbate anions are supplied by magnesium ascorbate, the bone mass after a predetermined period of time of consuming the beverage compositions will also be from about 10% to about 35% by weight greater than if the calcium aspartate and/or calcium orotate were used alone without the magnesium ascorbate or the combination of magnesium ascorbate plus calcium ascorbate.

The beverage compositions of this invention also include a sweetener agent. Preferably, the sweetener agent is selected from the group consisting of fructose, aspartame, stevioside, stevia, raubidicide A, and mixtures thereof. More preferably, the sweetener agent is selected from the group consisting of fructose, stevioside, Raubidiscide A, and mixtures thereof. Most preferably, the sweetneer agent is fructose.

Fructose is clearly the preferred sweetener agent for this invention in the non-dietetic form. Other sweeteners such as sucrose and glucose are not preferred. Sucrose is hydrolyzed in the digestive tract of the average human body into glucose and fructose. By employing pure fructose, in the beverage compositions of this invention, fructose becomes immediately available for absorption by the human body instead of having to wait for its availability as a by-product of a would-be sweetener such as sucrose. Fructose is the sweetest of all sugars and does not cause a marked rise in blood sugar as glucose does. This is important because high blood sugar levels also cause the production of insulin which will subsequently cause blood sugar levels to fall off rapidly to low or below normal levels. Such rapid decline in blood sugar levels results in immediate fatigue to the average human body. Fructose is prepared commercially in the crystalline form and even though it is presently one of the more expensive sugars, less fructose is to be used which makes it cost effective for the purposes of this invention.

The tartness agent is preferably incorporated in the beverage compositions of this invention in order to control tartness. The agent used for tartness is preferably natural and acidic. A preferred tartness agent is citric acid, and each 354 ml. of the beverage solution comprises from about 0.05 g. to about 0.7 g. of the citric acid.

Th pH adjusting agent, or preservative, is also preferably incorporated into the beverage compositions of this invention in order to adjust the pH of the beverage from about 3.0 to about 4.5 to preserve the beverage. The pH adjusting agent used as a preservative is preferably natural and bacteriostatic. A preferred pH adjusting agent is benzoic acid ($C_7H_6O_2$), and from about 0.35 g. to about 0.65 g. of the benzoic acid per each 354 ml. of the beverage solution, is added to the aqueous solution to adjust the pH of the beverage from about 3.0 to about 4.5.

A flavoring agent is recommended for the beverage compositions of this invention in order to mask any unpalatable taste that may originate from any of the beverage components. The flavoring agent is preferably all natural, non-toxic and pleasing to wide ranges of the population. Suitable flavoring agents have been found to be the lemon flavor #109715 FD&O (Fritche, Dodge and Olcott) and/or fruit punch flavor by FD&O. Preferred flavoring agents are natural fruit juices (e.g. orange juice, pineapple juice, apple juice, etc.) or extracts therefrom. The flavoring that each 354 ml. of beverage solution has is from about 0.18 ml. to about 36.0 ml. of the flavoring agent(s).

Another recommended agent for the beverage compositions of this invention is a smoothness agent for controlling the smoothness of the beverage. The agent for smoothness is preferably natural, and is a salt of the agent used for tartness. A preferred smoothness agent is selected from potassium citrate, calcium citrate, and mixtures thereof, which is a salt of a preferred tartness agent, citric acid. The potassium or calcium citrate, or a mixture of potassium and calcium citrate, is included in the beverage compositions of this invention comprises, per 354 ml. of beverage of solution, from about 0.20 g. to about 0.60 g. of potassium citrate or calcium citrate, or a mixture of potassium and calcium citrate.

The beverage compositions may be dehydrated to be in a form of a dry mixture suitable for reconstituting with a liquid solvent into the beverage compositions. In a preferred embodiment of the dry mixture, the dry beverage mixture comprises 0.5–50.0 meq. of calcium ions supplied by calcium ascorbate and a calcium compound selected from the group consisting of calcium aspartate, calcium orotate, and mixtures thereof, per 1.0–50.0.0 g. of the sweetener agent. Preferably, in this preferred embodiment of the dry mixture, the dry beverage mixtures comprises 0.5–10.0 meq. of calcium ions supplied by calcium ascorbate and a calcium compound selected from the group consisting of calcium aspartate, calcium orotate, and mixtures thereof, per 1.0–50.0 g. of the sweetener agent. The preferred embodiment of the dry mixture compositions preferably additionally comprise per 1.0–50.0 g. of the sweetener agent: from about 0.02 g. to about 3.5 g. of the tartness agent; from about 0.25 g. to about 1.0 g. of the pH adjusting agent; from about 0.1 g. to about 3.0 g. of the smoothness agent; and from about 0.05 ml. to about 50.0 ml. of the flavoring agent.

In a more preferred embodiment of the dry mixture, the dry mixture comprises 0.5–50.0 meq. of calcium ions supplied by calcium ascorbate and a calcium compound selected from the group consisting of calcium aspartate, calcium orotate, and mixtures thereof, per 1.0–50.0 g. of the sweetener agent; and 0.5–50.0 meq. of magnesium ions supplied by a magnesium compound selected from the group consisting of magnesium aspartate, magnesium orotate, and mixtures thereof, per 1.0–50.0 g. of the sweetener agent. In addition to the magnesium ions being supplied from magnesium aspartate and/or magnesium orotate, the magnesium ions may be supplied by magnesium ascorbate. Preferably, in this more preferred embodiment of the dry mixture, the dry beverage mixture comprises 0.5–10.0 meq. of calcium ions supplied by calcium ascorbate and a calcium compound selected from the group consisting of calcium aspartate, calcium orotate, and mixtures thereof, per 10.0–40.0 g. of the sweetener agent; and 0.5–5.0 meq. of magnesium ions supplied by a magnesium compound selected from the group consisting of magnesium aspartate, magnesium orotate, and mixtures thereof, per 10.0–40.0 g. of the sweetener agent. The magnesium ions may be additionally supplied from magnesium ascorbate. The more preferred embodiment of the dry mixture compositions preferably additionally comprise per 1.0–50.0 g. of the sweetener agent: from about 0.2 g. to about 1.5 g. of the tartness agent; from about 0.30 g. to about 0.9 g. of the pH adjusting agent; from about 0.15 g. to about 2.0 g. of the smoothness agent; and from about 0.1 ml. to about 45.0 ml. of the flavoring agent. As was the case for the more preferred embodiment of the beverage compositions, the more preferred embodiment of the dry beverage mixture is essentially free of potassium ions in that the dry beverage mixture contains no potassium ions except that present in minor amounts of flavoring agents, preservatives, or other minor additives.

The most preferred embodiment of the dry beverage mixture comprises 0.5–50.0 meq. of calcium ions supplied by calcium ascorbate and a calcium compound selected from the group consisting of calcium aspartate, calcium orotate, and mixtures thereof, per 1.0–50.0 g. of the sweetener agent; and 0.5–50.0 meq. of the magesium ions supplied by a magnesium compound selected from the group consisting of magnesium aspartate, magnesium orotate, and mixtures thereof, per 1.0–50.0 g. of the sweetener agent; and 1.0–10.0 meq. of potassium ions supplied by a potassium compound selected from the group consisting of potassium aspartate, potassium orotate, potassium ascorbate, and mixtures thereof, per 1.0–50.0 g. of the sweetener agent. As was seen for the preferred and more preferred embodiment of the dry beverage mixture, the magnesium ions may be additionally supplied from magnesium ascorbate. The most preferred embodiment of the dry mixture compositions preferably additionally comprise per 1.0–50.0 g. of the sweetener agent; from about 0.3 g. to about 0.7 g. of the tartness agent; from about 0.3 g. to about 0.6 g. of the pH adjusting agent; from about 0.2 g. to about 0.6 g of the smoothness agent; and from about 0.1 ml. to about 36.0 ml. of the flavoring agent.

Identical to the beverage compositions of the present invention, the preferred sweetener agent for the preferred, more preferred, and most preferred dry beverage compositions is selected from the group consisting of fructose, aspartame, steviocide, stevia, raubidiocide A and mixtures thereof; and the preferred tartness agent, smoothness, pH adjusting agent, and flavoring agent for the preferred, more preferred, and most preferred dry beverage compositions are respectively citric acid, potassium and/or calcium citrate, benzoic acid, and natural fruit juices.

In yet another preferred embodiment of the present invention, the beverage composition of the present inventions are in a concentrate form for admixing with a liquid solvent to provide the beverage composition. A preferred embodiment of the beverage concentrate comprises the beverage solution containing per less than 354 ml.: 0.5–50.0 meq. of calcium ions supplied by calcium ascorbate and a calcium compound selected from the group consisting of calcium aspartate, calcium orotate, and mixtures thereof; and 1.0–50.0 g. of the sweetener agent. A more preferred embodiment of the beverage concentrate comprises the beverage solution containing per less than 354 ml.: 0.5–50.0 meq. of the calcium ions supplied by the respective calcium compounds; 0.5–50.0 meq. of magnesium ions supplied by a magnesium compound selected from the group consisting of magnesium aspartate, magnesium orotate, and mixtures thereof, and 1.0–50.0 g. of the sweetener agent. The magnesium ions may be additionally supplied from magnesium ascorbate. The more preferred embodiment of the beverage concentrate is essentially free of potassium ions in that the beverage concentrate contains no potassium ions, except that present in minor amounts of flavoring agents, preservatives, or other minor additives. A more preferred embodiment of the beverage concentrate comprises the beverage solution containing per less than 354 ml.: 0.5–50.0 meq. of the calcium ions supplied by the respective calcium compounds; 0.5–50.0 meq. of magnesium ions supplied by the respective magnesium compounds; 1.0–10.0 meq. of potassium ions supplied by a potassium compound selected from the group consisting of potassium aspartate, potassium orotate, potassium ascorbate, and mixtures thereof; and 1.0–50.0 g. of the sweetener agent. The preferred potassium compound in the beverage concentrate is the potassium chelate selected from the group consisting of potassium aspartate, potassium orotate, and mixtures thereof.

The preferred, more preferred, and most preferred beverage concentrate of this invention, each additionally preferably comprises per less than 354 ml. of the beverage solution: from 0.02 g. to 3.5 g of the tartness agent; from 0.10 g to 3.0 g. of the smoothness agent; from 0.25 g to 1.0 g. of the pH adjusting agent; and from 0.05 ml. to 50.0 ml. of the flavoring agent(s).

The maximum concentration of each ingredient employed per each less than 354 ml. of the beverage solution in the concentrate of this invention may be any reasonable maximum concentration that depends on the amount of volume of beverage solution less than 354 ml., readily discernible to those artisans possessing ordinary skill in the art. Not to be unduly limited hereby, suitable concentrations for each ingredient has been found to be a concentration five (5) times that of the consumable beverage solution, such that each 70.8 ml. of beverage solution contains: 0.5–50.0 meq. of calcium ions supplied by the respective calcium compounds; 0.5–50.0 meq. of magnesium ions supplied by the respective magnesium compounds; 1.0–10.0 meq. of potassium ions supplied by the respective potassium compounds; 1.0–50.0 g. of the sweetener agent; 0.02–3.5 g. of the tartness agent; 0.10–3.0 g. of the smoothness agent; 0.25–1.0 g. of the pH adjusting agent; 0.05–50.0 ml. of the flavoring agent(s). In this concentration, 283.2 ml of the liquid solvent has to be added to the concentrate to constitute a consumable beverage. Obviously, the higher the concentration of the ingredients in the concentrate of this invention, the more liquid solvent has to be added to formulate the beverage composition of this invention and make the concentrate palatable to one's taste buds. The amount of liquid solvent that has to be added to the concentrate to formulate the beverage composition of this invention is easily attainable from the known concentration of each of the ingredients in the concentrate.

Another aspect of the present invention is the method of preparing or making the beverages of the present invention, including the beverage composition, the beverage dry mixture, and the beverage concentrate. In preparation of the preferred beverage compositions where the calcium chelate is employed, a predetermined volume of a liquid solvent (e.g. distilled water) is obtained which is the major component of the beverage solution and is the starting material in preparing and making the beverages. The exact quantity of liquid will depend and vary in accordance with the amount and solubility of beverage ingredients (e.g. fruit juices) and the nature of the liquid solvent (e.g. alcoholic vs. nonalcoholic) that are to be eventually added to the liquid solvent to produce the desired particular beverage composition, and the over-all volume of beverage or beverage solution that is to be produced. Generally, as was previously mentioned, from about 200 ml. to about 300 ml. of the liquid solvent should be used for every 354 ml. of beverage or beverage solution to be produced.

The liquid solvent has to be heated to at least 70° F. The maximum temperature being less than 230° F. in order to curtail evaporation of the liquid solvent and as a matter of economics. Preferably, the liquid solvent is only heated from about 70° F. to about 160° F., with 180° F. to 220° F. being the more preferred temperature range from heating.

After the liquid solvent has been heated to at least 70° F., per 354 ml. of the finished or finally prepared beverage product, 0.5–50.0 meq. of calcium ions are placed into the heated liquid solvent by adding calcium aspartate and/or calcium orotate to the heated liquid solvent. The heated liquid solvent mixture is stirred, preferably for at least one minute. More preferably, the heated liquid solvent mixture is stirred from about one minute to about five minutes, or until the calcium aspartate and/or calcium orotate is dissolved in the heated liquid solvent. In a more preferred embodiment of the invention, at least 15% of the 0.5–50 meq. of calcium ions are supplied by calcium ascorbate. Therefore, calcium ascorbate is preferably subsequently added to the stirred heated liquid solvent and the solution is stirred some more. The calcium ascorbate may be added to the heated liquid solvent along with the calcium aspartate and/or calcium orotate.

I have discovered that calcium aspartate and/or calcium orotate is or are not readily soluble salt(s) and will not be dissolved into the liquid solvent unless it is heated to at least 70° F., with 180° F. to 220° F. being the more preferred temperature. In producing the more preferred beverage composition and the most preferred beverage composition, the magnesium compound, or the magnesium compound and the potassium compound, may be added to the heated liquid solvent along with the calcium aspartate and/or calcium orotate (and the calcium ascorbate), or the respective compound or compounds may be added to the heated liquid solvent mixture after the calcium aspartate and/or calcium orotate (and the calcium ascorbate) has been dissolved therein. If the magnesium compound, or the magnesium compound and the potassium compound, is added to the heated liquid solvent mixture containing dissolved calcium aspartate and/or calcium orotate (and calcium ascorbate), the mixture should be stirred some more, say for at least one minute, to dissolve the compound(s) therein. All additions of the magnesium compound, or the magnesium and the potassium compound, should be such that each 354 ml. of the finished or finally prepared beverage product contains 0.5–50.0 meq. of magnesium ions or 0.5–50.0 meq. of magnesium ions and 1.0–10.0 meq. of potassium ions, respectively.

The beverage compositions of this invention should be prepared to preferably contain the preservative benzoic acid, potassium or calcium benzoate, as a pH adjusting agent in order to adjust the pH of the beverage to from about 3.0 to about 4.5. These preservatives may be added to the heated liquid solvent before the calcium chelates have been added and dissolved therein by stirring; or the preservatives may be added to the heated liquid solvent mixture after the calcium chelates have been dissolved therein, or after the admixture and dissolution of the calcium chelate and the magnesium compound/potassium compound. In either case, the heated liquid solvent or the heated liquid solvent mixture, has to have a temperature of at least 70° F., more preferably 180° F., and after the addition of the benzoic acid, potassium or calcium benzoate, the resulting mixture has to be stirred vigorously for at least one minute. Preferably, the heated liquid solvent or the heated liquid solvent mixture, is heated to a temperature of between 180° F. and 230° F. (more preferably between 185° F. and 220° F.) before the addition of the preservative, and after the preservative has been added, the resulting mixture is stirred vigorously from one minute to about five minutes. The addition of the perservative is to be at a quantity such that each 354 ml. of the finished or finally prepared beverage product contains from 0.25 g. to about 1.0 g. of the benzoic acid, potassium or calcium benzoate.

After the preservative and the calcium chelate and the magnesium/potassium compound(s) have been dissolved into the heated liquid solvent, the tartness agent (i.e. citric acid) and the smoothness agent (potassium citrate and/or calcium cetrate) should be added to heated liquid solvent mixture and the resulting mixture stirred until the ingredients are dissolved. The addition of these two ingredients does not require the liquid solvent mixture to possess any particular elevated temperature. Preferably, though, the tartness agent and the smoothness agent are added to the liquid solvent mixture containing the preservative and the metallic ions (i.e. Ca, Mg and K ions) at the existing temperature of liquid solvent mixture after the mixture has been stirred to dissolve the preservative and the calcium chelate and the magnesium/potassium compound(s). This addition should be such that each 354 ml of the finished or finally prepared beverage product contains from about 0.02 g. to about 3.5 g. of the tartness agent, and from about 0.10 g. to about 3.0 g. of the smoothness agent.

The beverages of this invention include a sweetener agent(s) (i.e. frutose, aspartame, steviocide, stevia, or raubidiocide A) and preferably a flavoring agent (i.e. fruit juices). Before the sweetener agent is added, the liquid solvent mixture containing the preservative, and the calcium chelates and magnesium/potassium compound(s) has to be cooled down from the 180°–200° F. preferred temperature to a temperature of from about 100° F. to about 160° F., preferably from about 140° F. to about 160° F. The sweetener agent is not added to the cooled down solution. The solution is now preferably further cooled to 70°–80° F. before the addition of the flavoring agent in order not to possibly distort the taste or flavor of the flavoring agent. After the addition of these two particular ingredients to the solution, the resulting cooled mixture should be stirred until the two ingredients are throughly mixed. The finished or finally prepared beverage product contains from about 0.05 ml. to about 50.0 ml. of the flavoring agent(s) and from about 1.0 g. to about 50.0 g. of the sweetener agent(s), per 354 ml. of final, consumable beverage solution. I have discovered that the calcium chelates of calcium aspartate and/or calcium orotate do not precipitate out of solution upon cooling, even down to the freezing point of the beverage. This differs and is unique with respect to other not readily soluble calcium salts which precipitate upon cooling, such as calcium carbonate and calcium gluconate.

In the event that it is desired to prepare the dry beverage mixture embodiment of the present invention, the finally prepared beverage solution is dehydrated, in accordance with well known procedures, such as dehydrating under a vacuum means, etc., in order to remove all of the liquid solvent (such as by evaporation, sublimation, etc.) and any other evaporable liquids present, such as those in the natural fruit juices (the flavoring agent).

The resulting dry beverage mixture is suitable for reconstituting with a suitable liquid solvent into the beverage solutions of this invention and the preferred dry beverage mixture comprises 0.5–50.0 meq. of calcium ions (supplied from the aspartate and/or the orotate, and the ascorbate of calcium) per 1.0–50.0 g. of the sweetener. The more preferred dry beverage mixture comprises 0.5–50.0 meq. of the calcium ions, per 1.0–50 g. of the sweetener; and 0.5–50.0 meq. of the magnesium ions (supplied from the aspartate and/or orotate, and, optionally, the ascorbate of magnesium) per 1.0–50.0 g. of the sweetener. The most preferred dry beverage mixture comprises 0.5–50.0 meq. of the calcium ions, per 1.0–50 g. of the sweetener; 0.5–50.0 meq. of the magnesium ions, per 1.0–50.0 g. of the sweetener; and 1.0–10.0 meq. of potassium ions (supplied from the aspartate, orotate, or the ascorbate of the potassium) per 1.0–50.0 g. of the sweetener. More preferably, each of the dry beverage mixture of this invention, additionally comprises the dehydrated form of the additive ingredients (i.e. the tartness agent, the smoothness agent, the preservative and the flavoring agent). If a consumer wishes to prepare a beverage solution from the dry beverage mixture, the consumer simply measures out a predetermined volume of the liquid solvent that has been removed in dehydration and adds from approximately 1½ tsps. to about 2½ tsps. of the preferred, more preferred, or most preferred dry beverage mixture for every 354 ml. of liquid solvent measured, which in a preferred embodiment of the invention is water.

In the event that it is desired to prepare the concentrate form of the beverages, there are two alternative preferred procedures of performing such preparation. One preferred procedure would be to start with less than the required volume of the liquid solvent that is used in the preparation of the finally prepared beverage immediately available for consumption. Another preferred procedure would be to partially dehydrate the finally prepared beverage to remove only a portion of the liquid solvent and any other evaporable liquids present emanating from the other additives, especially the natural fruit juices. The finally prepared preferred beverage concentrate comprises a beverage solution containing per less than 354 ml.: 0.5–50.0 meq. of the calcium ions from the respective calcium compounds, and 1.0–50 g. of the sweetener agent. The more preferred beverage concentrate when finally prepared comprises a beverage solution containing per less than 354 ml.: 0.5–50 meq. of the calcium ions from the respective calcium compounds; 0.5–50 meq. of the magnesium ions from the respective magnesium compounds; and 1.0–50 g. of the sweetener agent. The most preferred beverage concentrate when finally prepared comprises a beverage solution containing per less than 354 ml: 0.5–50.0 meq. of calcium ions from the respective calcium compounds; 0.5–50.0 meq. of magnesium ions from the respective magnesium compounds; 1.0–10.0 meq. of the potassium ions from the respective potassium compounds; and 1.0–50.0 g. of the sweetener agent. More preferably, each of the beverage concentrates of this invention additionally comprises the dehydrated form or the concentrated form of the additive ingredients (i.e. the flavoring agent, etc.). If a consumer wishes to prepare a beverage solution from the beverage concentrate, the consumer would add a predetermined volume of the liquid solvent (preferably carbonated water or beer) to predetermined volume of the beverage concentrate to reconstitute the consumable beverage solution or the beverage. The amount of liquid solvent to be added would obviously depend on the amount and type of liquid solvent missing from the beverage concentrate that would constitute the consumable beverage.

It is to be understood that while the stated particular tartness agent, smoothness agent(s), pH regulating agent, and flavoring agent(s) are the preferred for the purposes of this invention, it is not intended that any particular agent(s) that has been selected as the preferred, is to be construed to unduly limit the scope of my invention. Other particular tartness agent(s), smoothness agent(s), pH regulating agent(s), and flavoring agent(s) may be within the scope of my invention.

My invention will be illustrated by the following set forth examples which are given by way of illustration and not by any limitations. All parameters such as concentrations, mixing proportions, temperatures, pressures, rates, compounds, etc. submitted in these examples are not to be construed to unduly limit the scope of my invention. It is recognized that some test applicable to human beings yield results which at best are merely qualitative results due to the subjective sensations of the human subjects. It is further recognized that subjective sensations may vary so substantially from individual to individual that it is difficult to delineate well defined, quantitative results. However, even though test results are evidence of subjective sensations, it is believed that they are of objective value if unanimously elicited from a large number (e.g. 100 or more) of different human subjects.

EXAMPLE I

A beverage is prepared in accordance with the previous mentioned procedure such that the beverage solution contains per 354 ml.:
 (1) 20 meq. of calcium from aspartate salt
 (2) 32 meq. of magnesium from aspartate salt
 (3) 4 meq. of potassium from aspartate salt
 (4) 0.42 g. of citric acid
 (5) 0.31 g. of potassium citrate
 (6) 0.38 g. of benzoic acid
 (7) 3.86 g. of fructose or 1.93 g. steviocide or Raubidiocide A
 (8) 35.4 ml. of natural citrus or other juice
 (9) Balance carbonated water One-hundred (100) human subjects with a known average high blood pressure of 140/90 are administered the beverage in 354 ml. quantities twice daily. After three (3) months the average blood pressure for the human subjects is 125/80, proving that on an average the beverage lowers mean blood pressure.

EXAMPLE II

A beverage is prepared in accordance with the previous mentioned procedure such that the beverage solution contains per 354 ml.:
 (1) 20 meq. of calcium aspartate
 (2) 4 meq. of potassium aspartate
 (3) 0.42 g. of citric acid
 (4) 0.31 g. of potassium citrate
 (5) 0.38 g. of benzoic acid
 (6) 3.86 g. of fructose or 1.93 g. steviocide or Raubidiocide A
 (7) 35.4 ml of natural citrus or other juice
 (8) Balance carbonated water One-hundred (100) human subjects with known average high blood pressure of 140/90 are administered the beverage in 354 ml. quantities twice daily. After three (3) months the average blood pressure for the human subjects is 136/86, proving that on an average the beverage lowers blood pressure. This embodiment of the beverage does not lower mean blood pressure as much as the embodiment of Example I due to the absence of Mg ion.

EXAMPLE III

A beverage is prepared in accordance with the previous mentioned procedure such that the beverage solution contains per 354 ml.:
(1) 20 meq. Of Calcium from Ascorbate, and Aspartate and/or Orotate salt
(2) 32 meq Of Magnesium from Ascorbate, and Aspartate and/or Orotate Salt
(3) 28.32 g. of Hop-Malt Extract (any malt or hop based extract)
(4) Balance carbonated water One hundred (100) human subjects with a known average high blood pressure of 140/90 are administered the beverage in 354 ml. quantities twice daily. After three (3) months, the average blood pressure for the human subjects is 127/85, proving that on an average the beverage lowers blood mean pressure.

EXAMPLE IV

A beverage is prepared from one gallon of water, to which is added 40 meq. of potassium chloride, 8 meq. of calcium gluconate, 2 meq. of magnesium chloride and 8 ounces of sucrose. Flavoring is added to the homogeneous mixture, along with a trace of stabilizer.

One-hundred (100) human subjects with a known average high blood pressure of 140/90 are administered the beverage in 354 ml. quantities twice daily. After (3) months the average blood pressure for the human subjects is 142/92, with a number of the human subjects having nausea, stomach cramps, muscle spasm and reverse osmolarity from the beverage.

EXAMPLE V

A beverage is attempted to be prepared from one gallon of water, to which is added 40 meq. of potassium aspartate, 8 meq. of calcium aspartate, 2 meq. of magnesium aspartate and 8 ounces of sucrose. It is found that the mixture is not homogeneous because calcium aspartate is not readily soluble in water. If calcium orotate is substituted for the calcium aspartate, similar results would be observed. The aspartate and orotate salts of calcium are not readily soluble in water.

EXAMPLE VI

A beverage is prepared in accordance with the previous mentioned procedure such that the beverage solution contains per 354 ml.:
(1) 30 meq. of potassium aspartate
(2) 10 meq. of calcium aspartate
(3) 3 meq. of magnesium aspartate
(4) 3.86 g. of fructose
(5) Balance water One hundred-twenty (120) human subjects with a known calcium deficiency (hypercalcemia) are administered the beverage in 354 ml. quantities twice daily. After three (3) months, the calcium deficiency still remain in all human subjects, with a number of the human subjects having nausea and hyperkalemia from an overmedication with potassium ions and a limitation of fluid intake into the body.

EXAMPLE VII

A beverage is prepared in accordance with the previous mentioned procedure such that the beverage solution contains per 354 ml.:
(1) 1.0 meq. of calcium from calcium orotate
(2) 1.0 meq. of magnesium from magnesium orotate
(3) 1.0 meq. of potassium from potassium orotate
(4) 0.42 g. of citric acid
(5) 0.31 g. of benzoic acid
(6) 3.86g. of fructose or 1.93 g. steviocide or Raubidiocide A
(7) 0.36 g. of calcium citrate
(8) 35.4 ml. of natural citrus or other fruit juice
(9) Balance carbonated water One hundred-twenty (120) human subjects with a known calcium deficiency are administered the beverage in 354 ml. quantities twice daily. After three (3) months a number of the human subjects have a decrease or no calcium deficiency, with no human subjects having nausea, hyperkalemia, gastric upset or stomach bloating.

EXAMPLE VIII

Repeat Example VII but with the beverage solution containing per 354 ml.:
(1) 50.0 meq. of calcium from calcium orotate
(2) 50.0 meq. of magnesium from magnesium orotate
(3) 10.0 meq. of potassium from potassium orotate
(4) 0.42 g. of citric acid
(5) 0.38 g. of benzoic acid
(6) 3.86 g. of fructose, or 1.93 g. steviocide or Raubidiocide A
(7) 0.36 g. of calcium citrate
(8) 35.4 ml. of natural citrus or fruit juice
(9) Balance carbonated water The test results show that over 90% of the human subjects have no calcium deficiency, with no human subjects having nausea, hyperkalemina, gastric upset or stomach bloating. The results also show that over 90% of the human subjects have a lowering of their average blood pressure from their average blood pressure taken before the test.

EXAMPLE IX

Take the beverage of Example I and administer it in 354 ml. quantities twice daily to one-hundred twenty (120) human female subjects who have a history of hypertension and premenstrual syndrome. After three (3) months the hypertension has been reduced and the symptons of premenstrual syndrome are milder in the majority of the female subjects.

EXAMPLE X

Take the beverage of Example III and administer it in 354 ml. quantities twice daily to one-hundred twenty (120) male and female subjects who have a history of hypertension. After three (3) months, the mean blood pressure of the subjects show no net increase as might be expected from other malt beverages.

EXAMPLE XI

Repeat Example IX with the beverage of Example VII and find the same results.

EXAMPLE XII

Repeat Example IX with the beverage of Example VIII and find the same results.

EXAMPLE XIII

Repeat Example IX with the beverage of Example IV and find that the hypertension and symptoms of premenstrual syndrome of the female human subjects are not decreased. As a matter of fact, the majority of the female human subjects would also experience nausea, stomach cramps and muscle cramps which would aggravate the hypertension and premenstrual syndrome.

EXAMPLE XIV

Repeat example IX with the beverage of Example VI and find the results of Example XIII.

EXAMPLE XV

Tablets containing 250 mg. of potassium aspartate (about 1.5 meq.), 250 mg. of magnesium aspartate (about 3.2 meq.), and 5 mg of the A.T.P. (adenosine triphosphate) are administered twice daily to human subjects with a known average blood pressure of 140/90 and with calcium deficiency. After three (3) months the average blood pressure is not lowered and there is no decrease in calcium deficiency.

EXAMPLE XVI

Repeat Example XV for tablets containing 0.30 mg of only magnesium aspartate (about 0.004 meq.) but administer 5 tablets per 24 hours and find similar results.

EXAMPLE XVII

Repeat Example XV for tablets only containing 0.30 mg potassium aspartate (about 0.002 meq.) and find similar results.

EXAMPLE XVIII

Repeat Example XV for tablets only containing 250 mg potassium aspartate (about 1.5 meq.) and 6 mg A.T.P., but administer 1-6 times daily and find similar results.

EXAMPLE XIX

Repeat Example XV with 5 cc of a 2.5% solution of potassium aspartate (about 0.7 meq. of potassium aspartate) and find similar results.

EXAMPLE XX

Repeat Example XV with 5 cc of a 2.5% solution of magnesium aspartate (about 1.6 meq. of magnesium aspartate) and find similar results.

EXAMPLE XXI

Take the beverage of Example I and administer it twice daily one-hundred (100) human subjects having condition of anoxia. After three (3) months the cardiac tolerance to the anoxia condition generally increased (in some cases doubled) in a number of human subjects.

EXAMPLE XXII

Repeat Example XXI with the beverage of Example IV and find generally no increase in cardiac tolerance for a majority of the human subjects.

EXAMPLE XXIII

Repeat Example XXI with the beverage of Example VI and find the similar results of Example XXII.

EXAMPLE XXIV

A liquid solvent is obtained, preferably a potable water that has been demineralized, carbon filtered. Heat the liquid solvent to 100 F. For each 150 ml. of the heated liquid solvent add 0.5-50.0 meq. of calcium ions supplied by calcium ascorbate and a calcium compound selected from calcium aspartate, calcium orotate, and mixture thereof. Stir the heated solvent mixture until the calcium chelates are dissolved (approximately 1-5 minutes). Maintain the heated solvent mixture at 100 F., and add about 0.15 g. of the benzoic acid per 150 ml. of the heated liquid solvent. Stir the resulting mixture (e.g. 1-5 mins.) until the benzoic acid is dissolved. Per each 150 ml of about resulting mixture about 0.18 g. of citric acid and 0.12 g. of calcium citrate is added. The mixture is stirred again to homogenize the citric acid and calcium citrate into the mixture. The mixture is then cooled down to about 70 F. per 150 ml. of mixture, 10.2 g. of fructose is added, and stirred into dissolution; and subsequently, while the solution is still cool at about 70 F., approximately 15 ml. of natural fruit juice/150 ml. of cool solution is added as a flavoring agent and the solution is stirred. Make-up liquid solvent is now added until a cool beverage solution is produced containing per 354 ml.: 0.5-50.0 meq. of calcium ions supplied by calcium ascorbate and calcium aspartate and/or calcium orotate, 0.38 g. of benzoic acid, 0.42 g. of citric acid, 0.31 g. of calcium citrate and 40 ml. of natural fruit juice as the flavoring agent. Carbon dioxide is now added to 3.75 volumes.

EXAMPLE XXV

Repeat Example XXIV but the liquid solvent is at a temperature of 60 F. When the calcium aspartate and/or calcium orotate is added, it is discovered that it will not dissolve into the liquid solvent, even with stirring. The beverage can not be produced. If the temperature of the liquid solvent is raised to about 70 F., it is discovered that the calcium aspartate and/or calcium orotate begins to dissolve in solution and the beverage can be produced.

EXAMPLE XXVI

Repeat Example XXIV but allow the temperature of the heated liquid solvent containing the dissolved calcium chelates to decrease to about 60 F. When the benzoic acid is added, it is discovered that it will not dissolve in the liquid mixture even with vigorous stirring. The preservative for the beverage can not be dissolved into solution. If the temperature of the liquid mixture is raised to about 70° F., it is discovered that the benzoic acid presevative begins to dissolve in the calcium chelates solution with vigorous stirring. If the temperature of the subsequent liquid mixture is cooled down to 50° F., it is discovered that the calcium chelates of calcium aspartate and/or calcium orotate have not precipitated out of solution.

EXAMPLE XXVII

Distilled water is obtained and is heated to 120° F. For each 200 ml. of the heated distilled water, 0.38 g. of benzoic acid is added to the heated water, and the heated water containing the benzoic acid is stirred or shaken vigorously (typically 1-5 minutes) in order to dissolve the benzoic acid. After the benzoic acid has been dissolved into the heated water, and while the temperature of the benzoic acid solutions is at least 70°

F., preferably 120° F., 0.5–50.0 meq. of calcium ions from calcium aspartate, per each 200 ml. of benzoic acid solution, is added to the benzoic acid solution, and the resulting mixture is stirred for at least 1 minute to dissolve the calcium aspartate which is not readily dissolvable in water. In the more preferred embodiment of the invention, 0.5–50.0 meq. of magnesium ions from magnesium aspartate, per each 200 ml. of the mixture (which does not have to be any particular heated temperature at this stage, is added to the mixture containing dissolved benzoic acid and calcium aspartate. The solution is stirred for at least one minute to dissolve the magnesium aspartate into solution. The most preferred embodiment of the invention calls for 1.0–10.0 meq. of potassium ions from potassium aspartate to be added, per 200 ml. of the mixture containing the calcium and magnesium ion, which is not required to be at any particular heated temperature for the potassium aspartate to be dissolved therein. After the potassium aspartate has been added, the mixture is subsequently stirred to homogenize the aspartates. For each 200 ml. of mixture containing the calcium, magnesium and potassium ions the following additives may be added: 0.42 g. of citric acid and 0.31 g. of potassium citrate. The mixture is then stirred until the additives are in solution, and then the mixture is cooled down to about 45° F. Per 200 ml. of mixtures, 24 g. of fructose is added and stirred into solution; and subsequently, while the solution is still cool at about 45° F., approximately 40 ml. of natural fruit juice per 200 ml. of cool solution is added as a flavoring agent followed by stirring. The calcium aspartate does not precipitate out of solution. The beverage solution may be packaged/canned in this form and sold as a concentrate. Make-up carbonated water may be added until the beverage solution contains all of the meq. of the compounds and the respective grams and ml. of the additives per 354 ml. of beverage solution.

EXAMPLE XXVIII

A liquid solvent is obtained, preferably a potable water that has been demineralized, carbon filtered. Heat the liquid solvent to 180° F.. For each 354 ml. of the heated liquid solvent add 0.5–50.0 meq. of a calcium chelate selected from calcium aspartate, calcium orotate, and mixtures thereof. Stir the heated solvent mixture until the calcium chelate is dissolved, (approximately 1–5 minutes). Maintain the heated solvent mixture at 180° F., and add 0.31 g. of benzoic acid per 354 ml. of the heated liquid solvent. Stir the resulting mixture (e.g. 1–5 mins.) until the benzoic acid is dissolved. Per each 354 ml. of resulting mixture, next add 0.42 g. of citric acid and 0.36 g. of potassium citrate. The mixture is stirred again to homogenize the citric acid and calcium citrate into the mixture. The mixture is then cooled to 70° F. and 10.2 g. of fructose or 1.93 g. of steviocide or Raubidicide A is added and stirred into dissolution.

While the solution is still cool at about 70° F., 5 g. of calcium ascorbate and 35.4 ml. of natural fruit juice is added per each 354 ml. and the solution is further stirred.

Make-up liquid solvent is now added until an all cool beverage solution is produced containing per 354 ml.: 0.5–50.0 meq. of the calcium chelate, 0.31 g. of benzoic acid, 42 g. of citric acid, 0.36 g. potassium citrate, 10.2 g. fructose or 1.93 g. of steviocide or Raubidicide A, 5 g. calcium ascorbate and 35.4 ml. natural fruit juice. Carbon dioxide is next added to 3.75 volumes.

EXAMPLE XXIX

A beverage is prepared in accordance with the previous mentioned procedure such that the beverage solution contains per 354 ml. 20 meq. of calcium from aspartate salt or orotate salt.

The calcium is tagged with radioactive strontium 65. Prepare a beverage having per 354 ml. 20 meq. of calcium from the gluconate salt. The calcium in the calcium gluconate is tagged with radioactive strontium 65. Administer a predetermined quantity of the calcium aspartate or calcium orotate beverage to a set of 50 rats for ingestion and administer the same predetermined quantity of the calcium gluconate beverage to another set of 50 rats for ingestion.

Measure by RIA the amount of the calcium in the blood stream of each set of 50 rats by taking blood samples at one hour intervals. After (6) hours and at each hour interval find a greater quantity or concentration of calcium in the blood stream of the set of rats that ingested the calcium aspartate or calcium orotate, proving that the aspartate and orotate salts of calcium supply a rapidly and higher absorbable source of calcium than calcium gluconate.

EXAMPLE XXX

Repeat Example XXIX with 1 meq. of calcium aspartate or orotate and 1 meq. of calcium gluconate and find similar results.

EXAMPLE XXXI

Repeat Example XXIX with 50 meq. of calcium aspartate or orotate and 50 meq. of calcium gluconate and find similar results.

EXAMPLE XXXII

Repeat Example XXIX for each of calcium acetate, chloride, iodide, lactate, maleate, nitrate and proprionate, and find with respect to each calcium compound that the aspartate and orotate salts of calcium supply a rapidly and higher absorbable source of calcium than each of the calcium compound.

EXAMPLE XXXIII

Repeat Example XXIX for other calcium chelates (e.g. calcium lactate, calcium with lycine, calcium glutamate, etc.) other than calcium aspartate and/or orotate and find that the aspartate and orotate salts of calcium supply a more rapid and higher absorbable source of calcium than the other calcium chelates.

EXAMPLE XXXIV

A beverage is prepared in accordance with the previous mentioned procedure such that the beverage solution contains per 354 ml.:
(1) 20 meq. of calcium from the ascorbate salt and the aspartate salt
(2) 32 meq. of magnesium from the ascorbate salt and the aspartate salt
(3) 0.42 g. of citric acid
(4) 0.31 g. of potassium citrate
(5) 0.38 g. of benzoic acid
(6) 1.93 g. of steviocide or Raubidiocide A
(7) 35.4 ml. of natural citrus juice or flavoring agent
(8) Balance carbonated water One-hundred (100) human subjects are administered 354 ml. of the beverage. After a period of time sufficient for the beverage to get into the blood stream (30 min. to 1 hour) each of the human subjects consume four (4) martinis with the same quantity of alcohol. Blood samples are taken every hour on the hour for six (6) hours from the human subjects after the martini consumption and the amount/concentration of alcohol, and amount/concentration of aldehydes, in the blood of each human subject is recorded.

Three (3) days later and with the same 100 human subjects, the experiment is repeated but with the beverage of Example IV. Three (3) days later the experiment is again repeated with no beverage being administered and the blood samples are taken every hour on the hour to determine the amount/concentration of blood alcohol, and the amount/concentration of aldehydes in the blood with no beverage. The results show that the beverage of Example IV does not lower the amount/concentration of blood alcohol and the amount/concentration of aldehydes in the blood; and that the beverage of this invention lowers the amount/concentration of blood alcohol and the amount/concentration of aldehydes in the blood of a human body by 10 to 40%, with 30% being the mean. This proves that the beverage compositions accelerates the reduction of blood alcohol and aldehydes to inactive forms.

EXAMPLE XXXV

Repeat Example XXXIV but with the beverage of Examples VII and VIII and find similar results in that the amount/concentration blood alcohol and the amount/concentration of aldehydes in the blood are lowered from 10 to 40%.

EXAMPLE XXXVI

Repeat Example XXXIV but with the Tablets of Examples XV, XVI, XVII and XVIII and find that the tablets do not lower the amount/concentration blood alcohol nor the amount/concentration of aldehydes in the blood, but the beverage of this invention does.

EXAMPLE XXXVII

Repeat Example XXXIV but with the beverage additionally including per 354 ml. 5 g. of calcium ascorbate and 1-20 mg. of Vitamin $B_6$ and find that the amount/concentration of blood alcohol and the amount/concentration of aldehydes in the blood are lowered by an additional 5%. The ascorbate in combination with Vitamin $B_6$ interferes with the conversion of alcohol in the blood stream into inactive forms, and enables the reduced form to be passed in urine.

EXAMPLE XXXVIII

Repeat Example XXIX but destroy each set of rats after six (6) hours and analyze the tissues of each set of rats and find that a greater quantity or concentration of calcium in the tissues of the set of rats that ingested the calcium aspartate or calcium orotate.

EXAMPLE XXXIX

Repeat the procedure of Example XXIX with a beverage containing 20 meq. of calcium ion from aspartate salt or orotate salt and 20 meq. of magnesium ion from aspartate salt or orotate salt. When the amount of the calcium in the blood stream of each set of rats are measured, it is found that a greater quantity of the calcium ion has been transported or absorbed into the blood stream than if the 20 meq. of the calcium ion from aspartate salt or orotate salt was employed alone.

EXAMPLE XXXX

Repeat the procedure of Examples XXIX for 50 meq. of calcium ion from aspartate salt, and Example XXXIX for 50 meq. of calcium ion and 0.5-50 meq. of magnesium ion, both from aspartate salt, and find similar results in that a greater quantity of the calcium ion is absorbed into the blood stream than if 50 meq. of calcium ion is employed alone.

EXAMPLE XXXXI

Repeat Example XXXX but for 1 meq. of calcium ion and find similar results.

EXAMPLE XXXXII

Repeat the procedure of Example XXIX but for 20 meq. of magnesium ions from aspartate salt. Tag the magnesium radioactively. Measure the quantity of magnesium in the blood of each set of rats hourly for six (6) hours. Three (3) days later repeat the procedure of Example XXIX but for 20 meq. of calcium ions from aspartate salt. Measure the quantity of calcium in the blood of each set of rats hourly for six (6) hours. Six (6) days later repeat the procedure of Example XXIX but for 20 meq. of calcium ions and 20 meq. of magnesium ions together and find synergistic results in that a greater quantity of the calcium ions and/or magnesium ions (i.e. either singly or in combination) are absorbed into the blood stream with the use of 20 meq. of calcium ions plus 20 meq. of magnesium ions, than if 20 meq. of calcium ion is employed alone, or if 20 meq. of magnesium ions is employed alone. The magnesium ions in combination with the calcium ions accelerates the absorption of the calcium ion (and the magnesium ions) into the blood stream.

EXAMPLE XXXXIII

Repeat Examples XXXIX, XXXX, XXXXI, XXXXII and destroy each set of rats after six (6) hours and analyze the tissues of each set of rats and find similar synergistic results. The magnesium ions in combination with the calcium ions accelerates the absorption of the calcium ions (and the magnesium ions) into the tissues.

EXAMPLE XXXXIV

Repeat the procedure of Example XXIX for Examples XXXIX-XXXXIII for 1-10 meq. of potassium ions from aspartate or orotate salt (singly, in combination with the magnesium ions, and in combination with calcium ions and magnesium ions) and find similar synergistic results in all cases. The magnesium ions in combination with the calcium ions and potassium ions accelerates the absorption of the calcium ions, the calcium ions and the potassium ions (and the magnesium ions) into the blood stream, and into the tissues.

EXAMPLE XXXXV

Repeat the procedure of Example XXIX with a beverage containing per 354 ml. 20 meq. of calcium ascorbate; and for a beverage containing per 354 ml. 20 meq. of calcium ions supplied by calcium ascorbate and calcium aspartate and/or calcium orotate, and wherein 1.2 to 2.8 parts of calcium aspartate and/or calcium orotate are employed per each part calcium ascorbate. When the amount/concentration of calcium in the blood stream of each set of rats are measured, it is found that a greater quantity of the 20 meq. of calcium ions has been transported or absorbed into the blood stream than if 20 meq. of calcium ascorbate is employed alone or if calcium aspartate and/or orotate is employed alone. This proves combining calcium ascorbate with calcium aspartate and/or calcium orotate has a synergistic effect with respect to the amount/concentration of calcium ions that are absorbed into the blood.

EXAMPLE XXXXVI

Repeat Example XXXXV for other meqs. of calcium ions from 0.5 to 50 meqs. and find similar results. Calcium ascorbate unexpectedly aids and has a synergistic effect upon the absorption and transportation of calcium ions into the blood stream when employed with calcium aspartate and/or calcium orotate.

EXAMPLE XXXXVII

Repeat Example XXXXII, and three days after the last ingestion (or a time sufficient for the blood stream of the rats to be cleared of calcium and/or magnesium ions) repeat the procedure of Example XXIX for per 354 ml. of beverage solution 20 meq. of magnesium ions from aspartate salt plus 20 meq. of calcium ions supplied by calcium ascorbate and calcium aspartate and/or orotate, wherein 1.2 to 2.8 parts of calcium aspartate and/or calcium orotate are employed per each part calcium ascorbate, and find further and greater synergistic results in that a greater quantity of the calcium ions and/or magnesium ions are absorbed into the blood stream with the use of 20 meq. of calcium ion supplied by calcium ascorbate and calcium aspartate and/or orotate plus 20 meqs. of megnesium ions, than with the use of 20 meq. of calcium ions from aspartate salt plus 20 meq. of megnesium ions from aspartate salt. Calcium ascorbate catalyses the transportation or absorption of the calcium ions (and the magnesium ions) into the blood stream.

EXAMPLE XXXXVIII

Repeat Example XXXXVII for other meqs. of calcium ions and magnesium ions from 0.5 to 50 meqs. and find similar results. The ascorbate anion unexpectedly has a synergistic effect upon the absorption and transportation of calcium ions (and magnesium ions) into the blood stream when employed with calcium aspartate and/or calcium orotate and magnesium ions supplied by magnesium aspartate and/or magnesium orotate.

EXAMPLE XXXXIX

A first beverage is prepared in accordance with the previous mentioned procedure such that the first beverage solution contains per 354 ml. 10 meq. of calcium ions from calcium aspartate and/or calcium orotate. Administer a first predetermined quantity of the first beverage daily for one (1) year to a first set of 50 one (1) year old rats for ingestion. This first set of one (1) year old rats are in an ascorbic acid free diet (i.e. Vitamin C) and an ascorbate salt free diet (especially of the cations K, Mg and Ca).

A second beverage is prepared in accordance with the previous mentioned procedure such that the second beverage solution contains per 354 ml. 10 meq. of calcium ions from calcium ascorbate and calcium aspartate and/or calcium orotate wherein 1.2 to 2.8 parts of calcium aspartate and/or calcium orotate are employed per each calcium ascorbate. Alternatively, at least 15% of the calcium ions are supplied by the calcium ascorbate. Administer a second predetermined quantity (which is identical to the first predetermined quantity) of the second beverage daily for one (1) year to a second set of 50 one (1) year old rats for ingestion. The remainder of the diet fro the second set of rats is identical to the remainder of the diet for the first set of rats. After one (1) year destroy both sets of rats, measure the bone mass of both sets of rats, and find that on an average the bone mass of the second set of rats are from 20 wt. % to about 30 wt. % greater than the bone mass of the first set of rats.

EXAMPLE XXXXX

Repeat Example XXXXIX for other meqs. of calcium ions ranging from 0.5 to 50 meq. and find similar results, proving that the ascorbate anion of calcium ascorbate aids the use by the human body of the calcium ions that have been absorbed into the blood for formation of bone matrix by directing, causing and/or facilitating the cause of the calcium ions to migrate or travel, or the like, to the bones of the human body to form the bone matrix.

EXAMPLE XXXXXI

Repeat Examples XXXXIX and XXXXX but with the first and second beverage solutions also containing 0.5–5.0 meq. of magnesium ions supplied by magnesium aspartate and/or magnesium orotate find an even greater synergistic results in that on an average the bone mass of the second set of rats are from 25 wt. % to about 35 wt. % greater than the bone mass of the first set of rats. Thus, an even greater bone mass can be formed by employment of the ascorbate anion in combination with the magnesium ions supplied by the magnesium aspartate and/or magnesium orotate. The magnesium ions in combination with the ascorbate anion catalyses or accelerates the directing or channeling of the calcium ions towards the bones for use in the formation bone matrix.

While the present invention has been described herein with reference to particular embodiments thereof, a latitude of modification, various changes and substitutions are intended in the foregoing disclosures, and it will be appreciated that in some instances some features of the invention will be employed without a corresponding use of other features without departing from the scope of the invention as set forth.

I claim:

1. A dry mixture suitable for reconstituting with a liquid solvent into a beverage for consumption by humans comprising 0.5–50.0 meq. of calcium ions supplies by calcium ascorbate and a calcium compound selected from the group consisting of calcium aspartate, calcium orotate, and mixtures thereof, per 1.0–50.0 g. of a sweetener agent.

2. The dry mixture of claim 1 wherein said sweetener agent comprises fructose.

3. The dry mixture of claim 1 wherein said sweetener agent is selected from the group consisting of aspartame, stevioside, stevia, Raubidiocide A, and mixtures thereof.

4. The dry mixture of claim 1 additionally comprising from about 0.02 g. to about 3.5 g. of a tartness agent per 1.0–50.0 g. of the sweetener agent.

5. The dry mixture of claim 1 additionally comprising from about 0.25 g. to about 1.0 g. of a pH adjusting agent per 1.0–50.0 g. of the sweetener agent.

6. The dry mixture of claim 1 additionally comprising from about 0.1g. to about 3.0 g. of a smoothness agent per 1.0–50.0 g. of the sweetener agent.

7. The dry mixture of claim 1 wherein said sweetener agent comprises fructose and aspartame.

8. A dry mixture suitable for reconstituting with a liquid solvent into a beverage for consumption by humans comprising 0.5-50.0 meq. of calcium ions supplied by calcium ascorbate and a calcium compound selected from the group consisting of calcium aspartate, calcium orotate, and mixtures thereof, per 1.0-50.0 g. of a sweetener agent; 0.5-50.0 meq. of magnesium ions supplied by a magnesium compound selected from the group consisting of magnesium aspartate, magnesium orotate, and mixtures thereof, per 1.0-50.0 g. of the sweetener agent.

9. The dry mixture of claim 8 wherein said sweetener agent comprises fructose.

10. The dry mixture of claim 8 wherein said sweetener agent is selected from the group consisting of aspartame, steveioside, stevia, Raubidiocide A, and mixtures thereof.

11. The dry mixture of claim 8 additionally comprising from about 0.2 g. to about 1.5 g. of a tartness agent per 1.0-50.0 g. of the sweetener agent.

12. The dry mixture of claim 8 additionally comprising from about 0.30 g. to about 0.9 of a pH adjusting agent per 1.0-50.0 g. of the sweetener agent.

13. The dry mixture of claim 8 additionally comprising from about 0.15 g. to about 2.0 g. of a smoothness agent per 1.0-50.0 g. of the sweetener agent.

14. The dry mixture of claim 8 wherein said sweetener agent comprises fructose and aspartame.

15. A dry mixture suitable for reconstituting with a liquid solvent into a beverage for consumption by humans comprising 0.5-50.0 meq. of calcium ions supplied by calcium ascorbate and a calcium compound selected from the group consisting of calcium aspartate, calcium orotate, and mixtures thereof, per 1.0-50.0 g. of a sweetener agent; 0.5-50.0 meq. of magnesium ions supplied by a magnesium compound selected from the group consisting of magnesium aspartate, magnesium orotate, and mixtures thereof, per 1.0-50.0 g. of the sweetener agent; 1.0-10.0 meq. of potassium ions supplied by a potassium compound selected from the group consisting of potassium aspartate, potassium orotate, and mixtures thereof, per 1.0-50.0 g. of the sweetener agent.

16. The dry mixture of claim 15 wherein said sweetener agent comprises fructose.

17. The dry mixture of claim 15 wherein said sweetener agent is selected from the group consisting of aspartame, stevioside, stevia, Raubidiocide A, and mixtures thereof.

18. The dry mixture of claim 15 additionally comprising from about 0.3 g. to about 0.7 g. of a tartness agent per 1.0-50.0 g. of the sweetener agent.

19. The dry mixture of claim 15 additionally comprising from about 0.3 g. to about 0.6 g. of a pH adjusting agent per 1.0-50.0 g. of the sweetener agent.

20. The dry mixture of claim 15 additionally comprising from about 0.2 g. to about 0.6 g. of a smoothness agent per 1.0-50.0 g. of the sweetener agent.

21. The dry mixture of claim 15 wherein said sweetener agent comprises fructose and aspartame.

22. A dry mixture suitable for reconstituting with a liquid solvent into a beverage for consumption by humans comprising 0.5-50.0 meq. of calcium ions supplied by calcium ascorbate and a calcium compound selected from the group consisting of calcium aspartate, calcium orotate, and mixtures thereof, per 1.0-50.0 g. of a sweetener agent; 0.5-50.0 meq. of magnesium ions supplied by magnesium ascorbate and a magnesium compound selected from the group consisting of magnesium aspartate, magnesium orotate, and mixtures thereof, per 1.0-50.0 g. of the sweetener agent.

23. A dry mixture suitable for reconstituting with a liquid solvent into a beverage for consumption by humans comprising 0.5-50.0 meq. of calcium ions supplied by calcium ascorbate and a calcium compound selected from the group consisting of calcium aspartate, calcium orotate, and mixtures thereof, per 1.0-50.0 g. of a sweetener agent; 0.5-50.0 meq. of magnesium ions supplied by a magnesium compound selected from the group consisting of magnesium aspartate, magnesium orotate, and mixtures thereof, per 1.0-50.0 g. of the sweetener agent; 1.0-10.0 meq. of potassium ions supplied by a potassium compound selected from the group consisting of potassium ascorbate, potassium aspartate, potassium orotate, and mixtures thereof, per 1.0-50.0 g. of the sweetener agent.

* * * * *